United States Patent Office 3,542,892
Patented Nov. 24, 1970

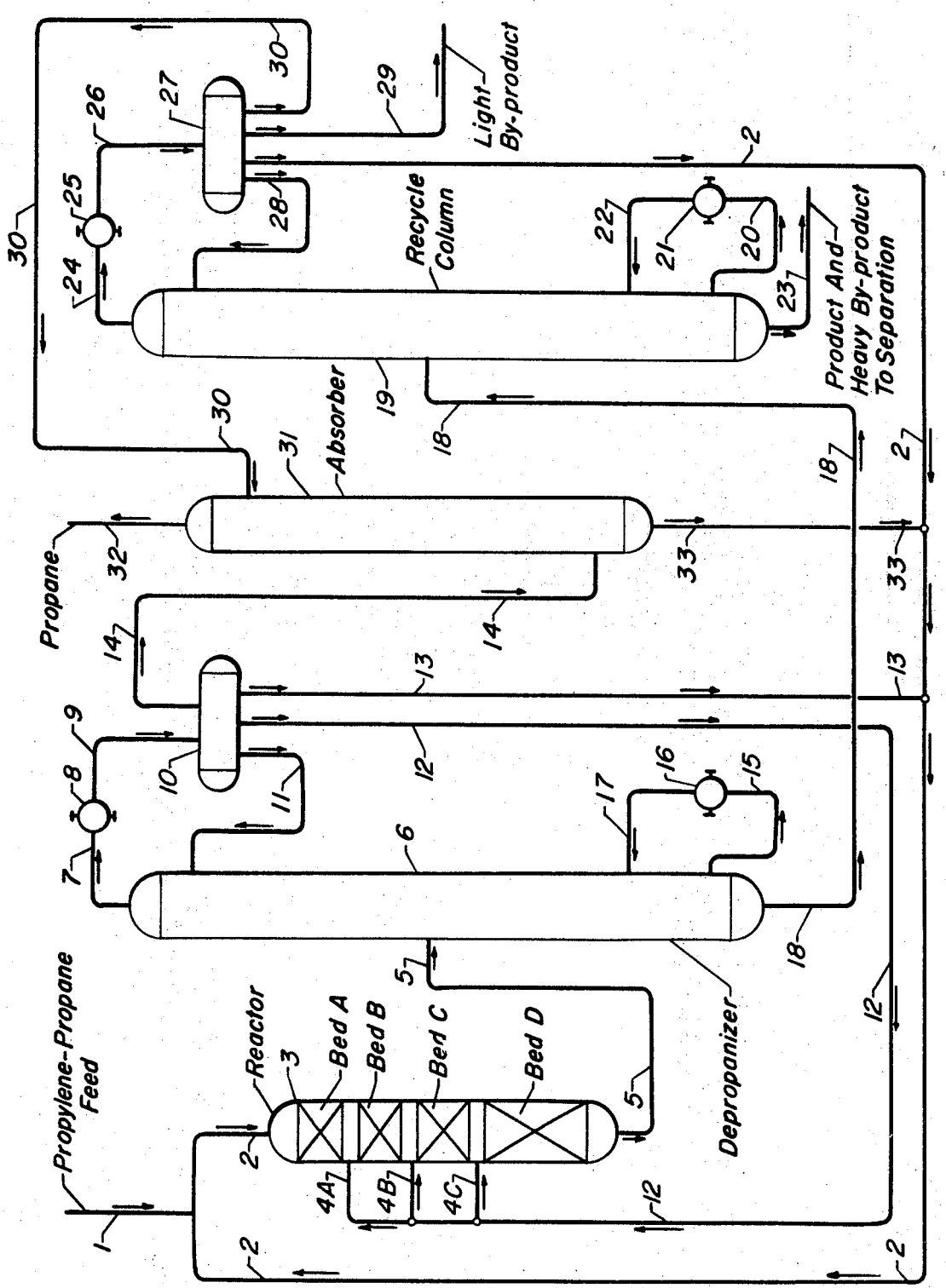

3,542,892
SEPARATION PROCESS FOR OLEFINIC
OLIGOMERIZATION AND AROMATIC
ALKYLATION
Ronald E. Stoker, Palatine, and Terrence M. Briggs, Des
Plaines, Ill., assignors to Universal Oil Products Company, Des Plaines, Ill., a corporation of Delaware
Filed Mar. 24, 1969, Ser. No. 809,592
Int. Cl. C07c 3/10, 3/52
U.S. Cl. 260—671                                    11 Claims

ABSTRACT OF THE DISCLOSURE

Separation process for a reaction zone effluent containing an unreactive diluent, such as an oligomerization reaction zone effluent. The effluent is separated into a diluent vapor fraction, a partially-oligomerized product fraction, and an oligomerized product fraction. A portion of diluent vapor fraction is contacted with a lean absorbent comprising a portion of partially-oligomerized product fraction, in an absorption zone under conditions sufficient to absorb a part of the portion of diluent vapor. Rich absorbent comprising diluent and partially oligomerized product is passed from the absorption zone into the reaction zone. The process is equally effective in the separation of an effluent from an aromatic alkylation reaction zone. Specific application of the process is in the synthesis of ethylbenzene, cumene, heptene, propylene-trimer, and propylene-tetramer.

FIELD OF INVENTION

The present invention relates to a separation process. It particularly relates to the separation of effluent from an alkylation reaction zone to provide a diluent for return to the reaction zone, a reactant for return to the reaction zone, and a product stream of alkylated aromatic compound. The inventive process also relates to the separation of the effluent from an oligomerization reaction zone to provide a diluent for return to the reaction zone, a stream of partially-oligomerized product for return to the reaction zone, and a product stream of oligomerized product. Most particularly the present invention relates to a method of separation which results in an improved process for alkylation of benzene with an ethylene-ethane mixture, for alkylation of benzene with a propylene-propane mixture, for the oligomerization of propylene in a propylene-propane mixture, and for the co-oligomerization of propylene and butene in a reactive mixture containing propane and butane.

The present invention finds one broad application in the production of alkylated aromatic hydrocarbons for use in subsequent chemical synthesis. The present invention particularly finds application in the production of isopropylbenzene or cumene which is utilized in the synthesis of phenol, acetone, alpha-methylstyrene, and acetophenone. These cumene-derived chemicals are intermediates in the synthesis of resins for plastics and nylon. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints.

Application of the inventive process may also be found in the alkylation of substituted aromatics such as phenol, which when alkylated with isobutylenes forms o-tertiary-butylphenol which is an intermediate in the synthesis of other chemicals, and forms p-tertiarybutylphenol which is used to modify phenol-formaldehyde resins. A further application of the inventive process upon substituted aromatic hydrocarbons may be found in the alkylation of para-hydroxyanisole with tertiary butyl alcohol or isobutylene to form butylated hydroxyanisole which finds utility as an antioxidant in the preservation of foods.

The present invention finds additional application in the oligomerization of olefin-acting compounds. Oligomerization of propylene may be undertaken to produce commercial fractions of propylene-trimer and propylene-tetramer, within the scope of the inventive process. Trimer finds utility in the synthesis of nonyl-phenol detergents and in the synthesis of decyl alcohols by the Oxo Process. The inventive process also finds application in the synthesis of commercial fractions of heptene which are produced by the co-oligomerization of propylene and butenes in a reaction mixture comprising propylene, propane, butene, and butane. Heptene is utilized in the synthesis of octyl alcohols by the Oxo Process. (It is to be noted that oligomerization of olefin hydrocarbons is more commonly referred to as "polymerization of olefins" in the petroleum refining industry.)

DESCRIPTION OF THE PRIOR ART

As indicated above, the present invention has one particular application in the recovery of isopropylbenzene, or cumene, from an alkylation reaction effluent. In the commercial manufacture of cumene it is the art to charge benzene and propylene into a reactor containing a solid phosphoric acid catalyst.

Because it is desired to minimize the dealkylation of benzene which produces diisopropylbenzene by-product, it is the art to have a molar deficiency of propylene in the reaction zone and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a Pyrolysis Plant, these diluents will normally be less than 10 mole percent, while a propylene feed derived from the gas recovery unit of a Fluid Catalytic Cracking Plant will often contain as much as 35 to 40 mole percent of unreactive diluents. In addition to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at several intermediate quench points between several fixed catalyst beds.

The alkylation effluent which leaves the typical reaction zone therefore contains a considerable amount of propane diluent. This diluent must be separated from the effluent in order that a portion may be recycled to the reaction zone and in order that a quantity may be withdrawn from the process. The quantity withdrawn is equivalent to the quantity which is being introduced into the process in the propylene-propane feed, and it must be withdrawn from the process in order to avoid accumulation of unreactive diluents in the process unit.

It is the art in the manufacture of cumene to charge the alkylation effluent to a fractionation train comprising a depropanizer column, a benzene column, and a cumene column. The effluent enters the depropanizer wherein the propane diluent is removed overhead to provide a liquid propane recycle stream for return to the reaction zone and a net propane vapor product stream which is normally withdrawn to the fuel gas system or sent to a recovery system for liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of nonaromatic contaminants which enter the process as trace constitutents in the benzene feed. The benzene column bottoms stream passes to a cumene column which produces an overhead comprising high purity cumene product and a bottoms by-product comprising polyalkylated benzene.

In the typical oligometrization process, an olefin-acting compound is oligomerized in the presence of an unreactive diluent to produce a desired oligomerized product and partially-oligomerized product which must be separated therefrom. For example, in the production of propylene-tetramer a typical propylene-propane feed is oligomerized over a solid phosphoric acid catalyst to produce a reactor effluent usually comprising propane, propylene-dimer, propylene-trimer, propylene-tetramer, and propylene-pentamer. It is, therefore, necessary to depropanize the reactor effluent in order to provide a recycle diluent propane stream for catalyst temperature control and to recycle the propylene-dimer and propylene-trimer to the reaction zone for further oligomerization with propylene to produce additional product propylene-tetramer. It is well known to those skilled in the art that the required separation of the reactor effluent is accomplished by passing the effluent into a series of fractionating columns comprising a depropanizer column, a column for obtaining the desired recycle fraction of partially-oligomerized product, and a column for recovery of the desired oligomerized product.

A similar series of fractionating columns is normally utilized in the separation of the reactor effluent resulting from the synthesis of heptene by co-oligomerization of propylene and butenes. The unreactive diluent which must be recycled to the reactor for temperature control normally comprises a liquid mixture of propane and butane. Because the olefinic feed contains propylene, butenes, and possible traces of other olefins, the reactor effluent will contain hexenes, heptenes, octenes, and heavier oligomerization products. It is the art to recover heptenes and octenes as the product fraction and to recycle hexenes and lighter olefins for additional oligomerization.

SUMMARY OF THE INVENTION

It is an object of the present invention to provide a method for the separation of a process stream containing at least three components. It is a further object of the present invention to provide a process for the separation of a reaction zone effluent containing an unreactive normally vapor diluent. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner.

These and other objectives will be readily ascertained from the following description and the attached drawing which is a simplified flow diagram setting forth one specific embodiment of the invention.

The present invention is particularly directed to aromatic alkylation and olefinic oligomerization wherein the olefin is in high concentration therefore requiring that only a slight amount of unreactive vapor diluent be removed from the process.

It is the art to operate the depropanizer column in the typical commercial cumene operating unit and the typical commercial propylene-tetramer operating unit at conditions of pressure and temperature sufficient to remove the propane diluent from the normally liquid constituents of the reactor effluent. In addition, these conditions are selected to provide that the propane diluent is removed from the overhead receiver of the depropanizer column in a liquid state in order that the propane may be pumped back into the reactor to provide the necessary propane diluent.

Where the propylene-propane feed is high in propylene and low in propane, only a slight amount of propane must be removed from the processing unit as a depropanizer vent gas. However, equilibrium conditions within the depropanizer column are often such that excessive propane diluent will be lost to the vapor phase and vented from the unit, thereby becoming unavailable for recycle to the reactor, unless a very high pressure is maintained in the depropanizer column. High pressure results in boiling point elevation for the compounds being processed within the depropanizer column. This boiling point elevation may be sufficient, in many instances, to cause thermal degradation of the liquid constituents in the reboiler, thus detrimentally effecting product purity and yield. Furthermore, the boiling point elevation in turn, requires a higher reboiler heat input and a higher condenser duty for the fractionating column thus producing increased utility expense. In addition, the fractionating tower, reboiler heat exchanger, overhead condenser system, and all other auxiliary equipment for the depropanizer column must be designed for higher pressure, thus adding to capital cost of the commercial operating unit.

By the process of the present invention, the depropanizer column is run at a pressure sufficient to separate the propane diluent from the liquid constituents of the reactor effluent. However, no attempt is made to maintain a pressure sufficient to provide that all of the propane diluent is removed from the overhead receiver in a liquid state. A net diluent vapor from the depropanizer column is removed from the system and passed to an absorption zone for contact with a lean absorbent under conditions sufficient to absorb a portion of the vented propane. A rich absorbent is removed from the absorption zone and passed back to the reaction zone.

Where the inventive process is applied to the recovery of unreactive vapor diluent in an aromatic alkylation process the lean absorbent which is passed to the absorption zone comprises the alkylatable aromatic compound which must be recycled to the reaction zone. Thus, for example, in a cumene synthesis unit the lean absorbent which is passed to the absorption zone for recovery of unreactive propane diluent would comprise the benzene recycle fraction or a portion thereof. In addition, where the inventive process is applied to an olefinic oligomerization unit, the vented propane diluent would be contacted in the absorption zone with a lean absorbent comprising at least a portion of the partially-oligomerized product which is recycled to the reaction zone. Thus, in a typical propane tetramer unit, the lean absorbent would comprise propylene-dimer and propylene-trimer which would be recycled to the reaction zone.

Broadly speaking, therefore, the process of the present invention may be characterized as a process for separating a reaction zone effluent containing at least three components which comprises passing the effluent from the reaction zone into a first separation zone maintained under separation conditions; withdrawing from the first separation zone a first fraction comprising first component vapor and a second fraction comprising second component and third component; contacting the first fraction with a lean absorbent hereinafter specified in an absorption zone maintained under conditions sufficient to absorb a portion of the first component vapor from the first fraction; passing a rich absorbent containing the portion of first component from the absorption zone to the reaction zone; passing the second fraction into a second separation zone maintained under separation conditions; withdrawing from thee second separation zone a third fraction comprising second component and a fourth fraction comprising third component; and passing a portion of the third fraction into the absorption zone as the lean absorbent specified.

A preferred embodiment of the present invention may be characterized by this separation process wherein the reaction zone comprises an aromatic alkylation reaction zone, the first component comprises an unreactive normally vapor diluent, the second component comprises an alkylatable aromatic compound, the third component comprises an alkylated aromatic compound and the alkylated aromatic compound is recovered.

A further preferred embodiment of the present invention may be characterized by this separation process wherein the reaction zone comprises an olefinic oligomerization reaction zone, the first component comprises an unreactive normally vapor diluent, the second component comprises partially-oligomerized product, the third component comprises oligomerized product, and the oligomerized product is recovered.

A clear understanding of the present invention may now be readily obtained by referring to the accompanying drawing which sets forth a simplified flow for illustrating one specific example wherein the process of the present invention is practiced.

DRAWING AND EXAMPLE

As previously noted, one particularly preferred embodiment of this invention comprises the inventive process wherein an olefinic oligomerization reaction zone produces an effluent containing an unreactive diluent comprising propane and a desired olefinic oligomerization product comprising propylene-tetramer.

Referring now to the drawing, a propylene-propane feed containing 95.5 mole percent olefinic constituent enters the process of the present invention via line 1 at a rate of 109.5 mols/hr. This propylene-propane feedstock is combined with a recycle liquid fraction comprising propylene-dimer, propylene-trimer and propane, entering the reaction zone of the inventive process via line 2 at a rate of 376.5 mols/hr. The resulting reactor feed mixture comprising 486.0 mols/hr. enters the reaction zone 3, containing four catalyst Beds A through D, via line 2 at a temperature of 350° F. and a pressure of 525 p.s.i.g. A propane diluent quench enters reactor 3 via lines 4A, 4B, and 4C from line 12 at a rate of 188.0 mols/hr. and a temperature of 110° F. This propane reactor quench stream is distributed by lines 4A, 4B, and 4C between the fixed catalyst beds, containing a solid phosphoric acid catalyst, in a manner sufficient to provide that the exothermic reaction occurring within the reaction zone will not produce a temperature rise in excess of 25° F. across the fixed catalyst beds.

The resulting reactor effluent leaves reactor 3 via line 5 at a rate of 596.6 mols/hr., and at a temperature of 367° F. and a pressure of 500 p.s.i.g. This reactor effluent is passed through a heat exchanger, not shown, and a control valve, not shown, and thereafter enters a depropanizer column 6 via line 5 at a temperature of 233° F. and a pressure of 267 p.s.i.g.

Depropanizer column 6 is operated under conditions sufficient to separate propane from the normally liquid constituents of the reactor effluent. A propane vapor is removed from column 6 via line 7 at a rate of 613.2 mols/hr., at a temperature of 121° F. and at a pressure of 265 p.s.i.g. The propane vapor is condensed and cooled in heat exchanger 8 before passing via line 9 into receiver 10 at a temperature of 110° F. and a pressure of 260 p.s.i.g. A first portion of the condensed propane diluent is removed from receiver 10 via line 11 at a rate of 297.1 mols/hr. and is passed into the top of depropanizer column 6 as the reflux stream. A second portion of the propane diluent is removed from receiver 10 via line 12 at a rate of 188.0 mols/hr. This portion is passed via line 12 to lines 4A, 4B, and 4C in order to provide the propane quench for the reactor as noted hereinabove. A third portion of propane liquid is removed from receiver 10 via line 13 at a rate of 100.1 mols/hr. This third portion is returned to the reaction zone as propane diluent in a manner which will be set forth hereinafter.

A net propane vapor is removed from receiver 10 via line 14 at a rate of 29.0 mols/hr., at a temperature of 110° F. and at a pressure of 260 p.s.i.g. This propane-rich vent gas is passed to an absorber 31 for recovery of a part of the propane diluent contained therein in a manner which shall be set forth hereinafter.

Depropanizer column 6 is provided with a typical reboiler circuit for imparting the necessary heat input for the distillation. A portion of the liquid at the bottom of depropanizer column 6 is withdrawn therefrom via line 15 at a temperature of 495° F. This liquid is passed through heat exchanger 16 wherein it is heated to 520° F. The heated liquids is then passed back to depropanizer column 6 via line 17 at a pressure of 270 p.s.i.g.

A net depropanizer bottoms liquid leaves depropanizer column 6 via line 18 at a temperature of 495° F., and at a rate of 280.5 mols/hr. This depropanizer bottoms stream comprising partially-oligomerized product and oligomerized product passes through a pressure reduction valve, not shown, and enters a recycle column 19 at a temperature of 364° F. and a pressure of 18 p.s.i.g.

Recycle column 19 is operated under conditions sufficient to separate partially-oligomerized product comprising propylene-dimer and propylene-timer, from oligomerized product comprising propylene-tetramer. Column 19 is provided with a typical reboiler circuit. A portion of the heavier liquid comprising the oligomerized product is withdrawn from the bottom of column 19 via line 20 at a temperature of 481° F. and a pressure of 20 p.s.i.g. This reboiler liquid passes through heat exchanger 21 wherein it is heated to 505° F. The liquid is then returned to the bottom of recycle column 19 via line 22. A second portion of the bottoms liquid is withdrawn from column 19 via line 23 at a rate of 21.4 mols/hr., and at a temperature of 481° F. This stream comprises oligomerized product and heavy oligomerized by-product and it is sent to a rerun column, not shown, wherein it is separated under conditions sufficient to provide 17.4 mols/hr. of tetramer product which is sent to product storage, and 4.0 mols/hr. of heavy polymer which is sent to by-product storage.

A net vapor leaves column 19 via line 24 at a rate of 399.4 mols/hr., at a temperature of 320° F. and at a pressure of 15 p.s.i.g. This vapor comprising partially-oligomerized product is condensed and cooled to 140° F. in heat exchanger 25 thereafter passed into receiver 27 via line 26 at 10 p.s.i.g. The condensed partially-oligomerized product is separated into four portions within receiver 27. A first portion leaves receiver 27 via line 28 at a rate of 140.3 mols/hr., and enters recycle column 19 via line 28 as the column reflux stream. A second portion of the partially-oligomerized product is withdrawn from receiver 27 via line 2 at a rate of 220.4 mols/hr. This second portion of partially-oligomerized product is then processed in a manner to be noted hereinafter. A third portion of the partially-oligomerized product is withdrawn from receiver 27 via line 29 at a rate of 5.7 mols/hr. This portion of the partially-oligomerized product is sent to a storage facility, not shown, as a net light polymer gasoline fraction and it may subsequently be used for gasoline blending components.

A fourth portion of the partially-oligomerized product is withdrawn from receiver 27 via line 30 at a rate of 33.0 mols/hr. This stream is passed through a heat exchanger, not shown, and cooled to 100° F. before entering the top of absorbed column 31. This stream of partially-oligomerized product provides the lean absorber oil with which the propane-rich vent gas from the depropanizer column 6 is contacted for absorption of propane. The lean absorbent enters the top of absorber column 31 at a temperature of 100° F. As the absorbent liquid contacts the upflowing vent gas, a portion of the propane is absorbed into the liquid phase, and the latent heat of absorption increases the temperature of the downflowing absorber liquid to 140° F. A net lean vent gas is withdrawn from absorber 31 via line 32 at a rate of 5.0 mols/hr. This vent gas is typically sent to a fuel gas system or to a LPG recovery system, not shown.

The rich absorbent containing propane is withdrawn via line 33 from the bottom of absorber column 31 at a rate of 56.0 mols/hr. and a temperature of 140° F. The rich absorber oil comprising partially-oligomerizer product and propane is combined in line 2 with the partially-oligomerized product passing from receiver 27 via line 2 at a rate of 220.4 mols/hr. to provide a recycle liquid mixture flowing at a rate of 276.4 mols/hr. This recycle liquid mixture is further combined in line 2 with the propane cycle passing from receiver 10 via line 13 at a rate of 100.1 mols/hr., to provide a total net recycle stream of 376.5 mols/hr. The total net recycle stream comprising propylene-dimer, propylene-trimer, and propane is passed via line 2 to the reaction zone wherein it is combined with the fresh propylene-propane feed of line 1 to provide the total reactor charge as noted hereinabove.

PREFERRED EMBODIMENT

In the foregoing example, it will be noted that the total propane fraction which was returned to the reactor comprised 311.1 mols/hr. The propane returned consisted of 188.0 mols/hr. of propane quench via line 12, 100.1 mols/hr .of propane recycle feed via line 13, and 23.0 mols/hr. of propane absorbed in the rich absorbent stream of line 33. If this total propane were removed from the depropanizer overhead receiver 10 as a liquid in the normal prior art manner, 430 p.s.i.g. of pressure would have been required on receiver 10. However, the volatility characteristics of the material being fractionated in depropanizer column 6 in the instant example was such that the relative volatility of the propane and the partially-oligomerized product decreases under this elevated pressure. It was found in the process of the foregoing example that this pressure of 430 p.s.i.g. on the depropanizer column 6 would make the equilbrium separation between the propane and the partially-oligomerized product extremely difficult, if not impossible, utilizing typical prior art operation.

It will be noted that in the example given, the depropanizer reboiler outlet was operated at a temperature of 520° F. and a pressure of 270 p.s.i.g. If it were required to condense all of the propane (311.1 mols/hr.) being returned to the reactor, the elevation of pressure would created a boiling point elevation such that a temperature extremely in excess of 520° F. would be required. The boiling point elevation would require that a high intensity heat source be utilized for the heat exchanger 16. This means that the reboiler required for the depropanizer column would have to be a direct fired furnace, thus increasing capital cost. In addition, the boiling point elevation and the high heat exchanger skin temperatures would result in increased thermal cracking and polymerization of partially-oligomerized product and oligomerized product as the reboiler liquid passed through the heat exchanger system 15 of the depropanizer column 6, thus decreasing product purity and yield.

By the inventive process which has been illustrated in the drawing and example disclosed hereinabove, these disadvantages of operation by the prior art separation method are eliminated.

Those skilled in the art will readily perceive that the processs disclosed in this example is not only applicable to the specific olefinic oligomerization process disclosed, but that it is also applicable to aromatic alkylation separation. For example, in cumene synthesis recycle column 19 will be operated to separate unreacted benzene for return to the reaction zone, from the alkylated aromatic products (cumene product and heavy alkylbenzene by-product). Therefore, it is apparent that the lean absorbent which would be sent to absorber column 31 via line 30 would comprise a portion of the benzene being recycled to the reactor. In addition, it will be perceived that the recycle being sent to the reactor via line 2 would comprise benzene and that the rich absorber oil being sent to the reactor via line 33 and line 2 would comprise benzene and propane.

These and other modifications of the process illustrated hereinabove are readily ascertainable by those skilled in the art as applied to any specific aromatic alkylation process or any specific olefinic oligomerization process.

It is to be noted that the operating conditions as set forth in the example are specific to that example and are in no way to be construed as limited upon the separation process of the present invention. For example, a broad range of operating conditions may be employed in the reaction zone.

In an olefinic oligomerization reaction zone, for example, the mole ratio of diluent vapor to olefinic vapor may be in the range of from about 1:1 to about 6.1. Where the olefinic oligomerization reaction zone synthesizes propylenetetramer as in the illustrative example, a mole ratio in the range of from about 1:1 to about 2:1 may be utilized. Reaction temperatures may be in the range of from about 250° F. to 500° F., and when the synthesis is undertaken in the presence of a typical solid phosphoric acid catalyst, a temperature in the range of from about 300° F. to 450° F. is preferred. The oligomerization reaction typically will be undertaken at a pressure in the range of from about 300 p.s.i.g. to about 1000 p.s.i.g. or higher, but normally 500 p.s.i.g. is preferred. The liquid hourly space velocity of the total combined feed to the reactor may be in the range of from 0.5 to about 5.0 but preferably the space velocity will be in the range of from about 1.0 to about 3.0. Specific operating conditions for the synthesis of any oligomerization product, such as heptene fractions, propylene-trimer, and propylene-tetramer, are readily ascertainable to those skilled in the art when utilizing the typical solid phosphoric acid catalyst or any other catalyst composition.

As noted previously, the inventive separation process may be used to separate the effluent from an aromatic alkylation reaction zone. In the alkylation of aromatic compounds with an olefin-acting compound it is the art to provide a molar deficiency of the olefin. The molar deficiency of olefin-acting compound to alkylatable aromatic is maintained by holding an aromatic to olefin molar ratio in the range of from 2:1 to about 30:1 with a preferred range of 4:1 to about 16:1. This molar deficiency is required in order to minimize polyalkylation of the aromatic compound. When utilizing a solid phosphoric acid catalyst in the reaction zone, it is particularly preferred that the ratio of aromatic to olefin should be about 8:1 when producing cumene and about 12:1 when producing ethylbenzene.

The amount of unreactive vapor diluent, propane in cumene synthesis and ethane in ethylbenzene synthesis which is recycled to the reaction zone, will vary as required to maintain the catalyst temperature at the desired level. Typically, the molar ratio of diluent to olefin will be in the range of from about 0.5:1.0 to about 4.0:1.0, with a 2:1 molar ratio of propane to propylene being preferred in the synthesis of cumene. The temperature of the reaction zone may be from 300° F. to about 600° F., and when utilizing a solid phosphoric acid catalyst will normally range from 350° F. to 450° F. for cumene and 450° F. to 550° F. for ethylbenzene. The pressure of the alkylation reatcion may be from 300 pounds per square inch to 1000 pounds per square inch or even higher. The liquid hourly space velocity of the total combined feed to the reaction zone may range from 0.5 to 5.0, but will normally be in the range of 1.0 to 1.5. The specific reactor operating conditions which are required for the alkylation of any aromatic hydrocarbon or other alkylatable aromatic compound when utilizing a solid phosphoric acid catalyst or any other catalyst are readily ascertainable by those skilled in the art.

Referring now to the separation process, depropanizer column 6 will normally operate in a range of from 200 p.s.i.g. to 300 p.s.i.g. The top temperature of depropanizer column 6 will normally be in the range of from 60 to 150° F. and preferably, the temperature maintained in receiver 10 will be from 80 to 120° F. The reboiler temperature which is maintained in depropanizer column 6 will depend upon the composition of the normally liquid constituents which must be depropanized. Thus, where propylene-tetramer is being synthesized, the column will operate with a reboiler temperature in the range of from about 450° F. to about 550° F. Where cumene synthesis effluent is being depropanized, the reboiler temperature normally will be in the range of from about 380° F. to about 450° F. Other reboiler temperature ranges are readily ascertainable by those skilled in the art for any other specific oligomerization product or aromatic alkylation product.

The operating conditions which must be maintained within absorber column 31 are also specific to this example. In general, those skilled in the art know that the absorption column must be operated at a temperature as low as possible and a pressure as high as possible. Thus, it is preferable that the temperature within absorber 31 be maintained in the range of 60° F. to 120° F. The bottoms liquid temperature from the absorber will, of course, be effected by the inlet temperature of the gas, the lean absorbent oil temperature, and the latent energy released by the vapor which is absorbed by the absorbent. Typically, the bottoms temperature will be from 5° F. to 50° F. hotter than the lean absorber oil temperature. However, in many instances, it will be desirable to provide an absorber intercooler in order to chill the downflowing absorbent before it reaches the bottom of the tower. The chilling of the absorber oil at an intermediate locus in the column is a well-known prior art technique. The pressure within absorber 31 will normally be slightly below the pressure of the preceding receiver 10, although higher pressure may be employed by placing compressor means in line 14. Preferably, absorber 31 will be maintained at about 100 p.s.i.g. to 300 p.s.i.g. for propane recovery, but at higher pressure for ethane recovery as in ethylbenzene synthesis. In addition, it must be noted that the ratio of absorber oil to the upflowing gas is specific to this example since this ratio will depend upon stream compositions and other considerations well known to those skilled in the art. Those skilled in the art will readily ascertain the specific operating conditions must be selected within absorber column 31 for any specific flow rate and composition of gas, and for any specific absorber oil composition.

It is further to be noted that the separation process of the example contains a recycle column and that in this example the recycle column separated partially-oligomerized product from oligomerized product. As noted hereinabove, however, the recycle column may separate benzene from alkylated aromatic products when the inventive separation process is employed in separating reactor effluents from an aromatic alkylation reaction zone. These separations of partially oligomerized product from oligomerized product, and of alkylatable aromatic compound from alkylated aromatic compound will be undertaken at operating conditions which are well known in the art. It is not, therefore, necessary within the description of this invention to discuss the broad range of operating conditions which are required for the recycle column in specific applications, nor is it necessary to set forth operating conditions for the rerun column which, as noted in the example, is required in the overall process but which was not shown in the drawing. The operating conditions required for the recycle column and the return column are readily ascertainable by those skilled in the art for any specific composition of components being separated therein.

From the foregoing discussion, it may now be summarized that one preferred embodiment of the inventive process is a process for the recovery of alkylated aromatic compound from an alkylation reaction zone effluent from the reaction zone into a first separation zone maintained under separation conditions; withdrawing from the first separation zone a first reaction comprising diluent vapor and a second fraction comprising alkylatable aromatic compound and alkylated aromatic compound; contacting the first fraction with a lean absorbent hereinafter specified in an absorption zone maintained under conditions sufficient to absorb a portion of diluent vapor from the first fraction; passing a rich absorbent containing diluent from the absorption zone into the reaction zone; passing the second fraction into a second separation zone maintained under separation conditions; withdrawing from the second separation zone a third fraction comprising alkylated aromatic compound and a fourth fraction comprising alkylated aromatic compound; passing a portion of the third fraction into the absorption zone as the lean absorbent specified; and recovering the fourth fraction.

In addition, it may be noted that another preferred embodiment of the inventive process is a process for recovery of oligomerized compound from an oligomerized reaction zone effluent, comprising unreactive diluent, partially-oligomerized compound, and oligomerized compound which comprises, passing the effluent from the reaction zone into a first separation zone maintained under separation conditions; withdrawing from the first separation zone a first fraction comprising diluent vapor and a second fraction comprising partially-oligomerized compound and oligomerized compound; contacting the first fraction with a lean absorbent hereinafter specified in an absorption zone maintained under conditions sufficient to absorb a portion of diluent vapor from the first fraction; passing a rich absorbent containing diluent from the absorption zone into the reaction zone; passing the second fraction into a second separation zone maintained under separation conditions; withdrawing from the second separation zone a third fraction comprising partially-oligomerized compound and a fourth fraction comprising oligomerized compound; passing a portion of the third fraction into the absorption zone as the lean absorbent specified; and recovering the fourth fraction.

The invention claimed:

1. Process for separating a reaction zone effluent containing at least three components which comprises:
 (a) passing said effluent from said reaction zone into a first separation zone maintained under separation conditions;
 (b) withdrawing from said first separation zone, a first fraction comprising first component vapor, and a second fraction comprising second component and third component;
 (c) contacting said first fraction with a lean absorbent hereinafter specified in an absorption zone maintained under conditions sufficient to absorb a portion of first component vapor from said first fraction;
 (d) passing a rich absorbent containing said portion of first component, from said absorption zone to said reaction zone;
 (e) passing said second fraction into a secod separation zone maintained under separation conditions;
 (f) withdrawing from said second separation zone, a third fraction comprising second component, and a fourth fraction comprising third component; and, (g) passing a portion of said third fraction into said absorption zone as said lean absorbent specified.

2. Process of claim 1 wherein a second portion of said third fraction is passed into said reaction zone.

3. Process of claim 1 wherein a fifth fraction comprising diluent is withdrawn from said first separation zone and said fifth fraction is passed into said reaction zone.

4. Process for recovery of alkylated aromatic compound from an alkylation reaction zone effluent comprising unreactive diluent, alkylatable aromatic compound, and alkylated aromatic compound which comprises:

(a) passing said effluent from said reaction zone into a first separation zone maintained under separation conditions;

(b) withdrawing from said first separation zone, a first fraction comprising diluent vapor and a second fraction comprising alkylatable aromatic compound and alkylated aromatic compound;

(c) contacting said first fraction with a lean absorbent hereinafter specified in an absorption zone maintained under conditions sufficient to absorb a portion of diluent vapor from said first fraction;

(d) passing a rich absorbent containing diluent from said absorption zone into said reaction zone;

(e) passing said second fraction into a second separation zone maintained under separation conditions;

(f) withdrawing from said second separation zone, a third fraction comprising alkylatable aromatic compound and a fourth fraction comprising alkylated aromatic compound;

(g) passing a portion of said third fraction into said absorption zone as said lean absorbent specified; and, (h) recovering said fourth fraction.

5. Process of claim 4 wherein said absorption zone is maintained at a temperature in the range of from about 60° F. to about 110° F., and at a pressure in the range of from about 100 p.s.i.g. to about 300 p.s.i.g.

6. Process of claim 4 wherein said unreactive diluent comprises ethane, said alkylatable aromatic compound comprises benzene, and said alkylated aromatic compound comprises ethylbenzene.

7. Process of claim 4 wherein said unreactive diluent comprises propane, said alkylatable aromatic compound comprises benzene, and said alkylated aromatic compound comprises cumene.

8. Process for recovery of oligomerized compound from an oligomerization reaction zone effluent comprising unreactive diluent, partially-oligomerized compound, and oligomerized compound which comprises:

(a) passing said effluent from said reaction zone into a first separation zone maintained under separation conditions;

(b) withdrawing from said first separation zone, a first fraction comprising diluent vapor and a second fraction comprising partially-oligomerized compound and oligomerized compound;

(c) contacting said first fraction with a lean absorbent hereinafter specified in an absorption zone maintained under conditions sufficient to absorb a portion of diluent vapor from said first fraction;

(d) passing a rich absorbent containing diluent from said absorption zone into said reaction zone;

(e) passing said second fraction into a second separation zone maintained under separation conditions;

(f) withdrawing from said second separation zone, a third fraction comprising partially-oligomerized compound and a fourth fraction comprising oligomerized compound;

(g) passing a portion of said third fraction into said absorption zone as said lean absorbent specified; and, (h) recovering said fourth fraction.

9. Process of claim 8 wherein said absorption zone is maintained at a temperature in the range of from about 60° F. to about 110° F., and at a pressure in the range of from about 100 p.s.i.g. to about 300 p.s.i.g.

10. Process of claim 8 wherein said diluent comprises propane and said oligomerized product comprises one of the group consisting of propylene-trimer and propylene-tetramer.

11. Process of claim 8 wherein said diluent comprises one of the group consisting of propane, butane, and a propane-butane mixture, and said oligomerized product comprises heptene.

References Cited

UNITED STATES PATENTS

| | | | |
|---|---|---|---|
| 3,122,496 | 2/1964 | Harper | 208—342 |
| 3,437,705 | 4/1969 | Gantt et al. | 260—671 |
| 3,437,707 | 4/1969 | Sulzbach | 260—671 |
| 3,470,084 | 9/1969 | Scott | 208—341 |
| 3,477,946 | 11/1969 | Borst | 208—342 |

DELBERT E. GANTZ, Primary Examiner

C. R. DAVIS, Assistant Examiner

U.S. Cl. X.R.

208—340, 342; 260—674, 683.15